United States Patent
Tsai (10) Patent No.: US 10,416,029 B2
(45) Date of Patent: Sep. 17, 2019

(54) WATER TEMPERATURE DETECTION VALVE

(71) Applicant: AGREAT SHOWER & SANITARY (XIAMEN) CO., LTD., Xiamen, Fujian Province (CN)

(72) Inventor: Pi Kuang Tsai, Xiamen (CN)

(73) Assignee: AGREAT SHOWER & SANITARY (XIAMEN) CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/986,819

(22) Filed: May 23, 2018

(65) Prior Publication Data

US 2018/0340843 A1  Nov. 29, 2018

(30) Foreign Application Priority Data

May 24, 2017 (TW) .............................. 106207420 U (51) Int. Cl.
*G01K 13/02* (2006.01)
*E03C 1/04* (2006.01)

(52) U.S. Cl.
CPC ................ *G01K 13/02* (2013.01); *E03C 1/04* (2013.01); *E03C 1/041* (2013.01); *E03C 2001/0418* (2013.01); *G01K 2013/026* (2013.01)

(58) Field of Classification Search
CPC .... E03C 1/04; E03C 1/041; E03C 2001/0418; G01K 13/02; G01K 2013/026
See application file for complete search history.

(56) References Cited

U.S. PATENT DOCUMENTS

| | | | | |
|---|---|---|---|---|
| 4,854,499 A * | 8/1989 | Neuman | ................... | E03C 1/04 236/93 B |
| 5,140,254 A * | 8/1992 | Katzman | ................ | A47K 3/281 290/54 |
| 6,494,107 B1 * | 12/2002 | Kazazian | ............. | E03C 1/0404 374/E13.006 |
| 6,997,064 B2 * | 2/2006 | Bird | ........................ | G01F 1/115 73/149 |
| 7,919,877 B2 * | 4/2011 | Shimizu | ................ | E03C 1/0404 290/43 |
| 8,833,670 B2 * | 9/2014 | Chen | .................. | G05D 23/1393 137/625.41 |
| 9,062,439 B2 * | 6/2015 | Lee | ........................... | E03C 1/04 |
| 9,574,331 B2 * | 2/2017 | Wright | ...................... | E03C 1/02 |

* cited by examiner

*Primary Examiner* — Eric Keasel
(74) *Attorney, Agent, or Firm* — Leong C. Lei (57) ABSTRACT

A water temperature detection valve includes an external housing in which a rear water guide and a front water guide are arranged to respectively receive and retain a blade wheel and an electrical generator, which are movable in unison with each other, to arranged therein. A temperature detection unit includes a circuit board, a temperature sensor electrically connected to the circuit board, and an electrical output cable having an end electrically connected to the circuit board. The circuit board is electrically connected to the electrical generator. The electrical output cable extends outside the external housing. A water temperature display module includes a display device arranged inside a display holder that includes a light-transmitting window corresponding, in position, to the display device. An electrical input cable that is electrically connected to the display device has an end that is connectable, in a detachable manner, to the electrical output cable.

10 Claims, 8 Drawing Sheets

WATER TEMPERATURE DETECTION VALVE

(a) TECHNICAL FIELD OF THE INVENTION

The present invention relates generally to kitchen and bathroom equipment, and more particularly to a water temperature detection valve.

(b) DESCRIPTION OF THE PRIOR ART

Bathrooms and kitchens are areas of a building where the skins of human being may get contact with hot water most frequently. To avoid burning of the skins of human bodies by the hot water, it is common to add a device that detects and displays water temperature on a water dispense device. However, such a device is generally structured such that a detection part and a display part are combined together. This makes it only installable on a water dispense device that is located externally of a wall. For water piping or water conveyance device that is located internally of or embedded in a wall, such a device is not usable.

SUMMARY OF THE INVENTION

In view of the above, to improve the deficiencies of the prior art that the conventional water temperature detection device can only be installed on a water dispense device or a pipe that is located outside a wall, the present invention provides a water temperature detection valve, which generally comprises: an external housing, which is formed, in an interior thereof, with a compartment and comprises, formed therein, a water inlet opening formed thereon to communicate between the compartment and outside, a water outlet opening communicating between the compartment and the outside, and an installation hole communicating between the compartment and the outside; a rear water guide, which is arranged in the compartment of the external housing and comprises a plurality of water guide holes communicating between interior and exterior the rear water guide; a front water guide, which is arranged in the compartment of the external housing, the front water guide having a rear end coupled to a front end of the rear water guide, the front water guide comprising a water discharge hole communicating between interior and exterior of the front water guide, the water discharge hole being in communication with the water guide holes and the water outlet opening; a water temperature detection module, which is arranged in the interiors of the rear water guide and the front water guide to generate electrical power and to conduct detection of temperature of water inside the water discharge hole and comprises a blade wheel, a miniature electrical generator, and a temperature detection unit, wherein the blade wheel is arranged in the interior of the rear water guide; the miniature electrical generator is arranged in the interior of the front water guide; the miniature electrical generator is movable in unison with the blade wheel; the temperature detection unit comprises a circuit board, a temperature sensor electrically connected to the circuit board, and an electrical output cable having an end electrically connected to the circuit board, the circuit board being electrically connected to the miniature electrical generator, the circuit board being arranged in the interior of the front water guide, the temperature sensor being arranged in the water discharge hole, the electrical output cable extending outside the external housing; and a water temperature display module, which comprises a display device, a display holder, and an electrical input cable, the display device being arrange inside the display holder, the display holder comprises a light-transmitting window formed therein at a location corresponding to the display device, the electrical input cable having an end electrically connected to the display device and an opposite end connectable, in a detachable manner, to the electrical output cable. As such, the present invention allows a water temperature detection module to be mounted to a water dispense device or a pipe inside wall, while the water temperature display module is mounted to any location outside the wall in order to improve the convenience and adaptability of use.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, a water temperature detection valve 100 according to a preferred embodiment of the present invention generally comprises an external housing 10, a rear water guide 20, a front water guide 30, a water temperature detection module 40, a closure cover 50, and a water temperature display module 60.

Referring to FIGS. 1-4, the external housing 10 is formed, in an interior thereof, with a compartment 11 and comprises, formed therein, a water inlet opening 12 formed thereon communicating between the compartment 11 and the outside, a water outlet opening 13 communicating between the compartment and the outside, and an installation hole 14 communicating between the compartment 11 and the outside.

Referring to FIGS. 1-4, the rear water guide 20 is arranged in the compartment 11 of the external housing 10 and comprises a plurality of water guide holes 21 communicating between interior and exterior the rear water guide.

Referring to FIGS. 1-4, the front water guide 30 is in the form of a hollow cylinder or barrel. The front water guide 30 is arranged in the compartment 11 of the external housing 10. The front water guide 30 has a rear end coupled to a front end of the rear water guide 20. The front water guide 30 comprises a water discharge hole 31 communicating between interior and exterior of the front water guide. The water discharge hole 31 is in communication with the water guide holes 21 and the water outlet opening 13.

Referring to FIGS. 1-4, the water temperature detection module 40 comprises a blade wheel 41, a miniature electrical generator 42, and a temperature detection unit 43. The blade wheel 41 is arranged in the interior of the rear water guide 20. The miniature electrical generator 42 is arranged in the interior of the front water guide 30. The miniature electrical generator 42 has a spindle 421 that is coupled to a center axis of the blade wheel 41 to make the spindle 421 of the miniature electrical generator 42 movable in unison with the blade wheel 41. The temperature detection unit 43 comprises a circuit board 431, a temperature sensor 432 electrically connected to the circuit board 431, and an electrical output cable 433 having an end electrically connected to the circuit board 431. The circuit board 431 is electrically connected to the miniature electrical generator 42 to allow the miniature electrical generator 42 to supply electrical power necessary for operation thereof. The electrical output cable 433 has an opposite, free end that is formed with an output connector 434. The circuit board 431 is arranged in the interior of the front water guide 30. The temperature sensor 432 is arranged in the water discharge hole 31. The output connector 434 is arranged to extend outside the external housing 10.

Referring to FIGS. 1-4, the closure cover 50 is set in and closes the installation hole 14 of the external housing 10 in order to retain the rear water guide 20, the front water guide 30, and the water temperature detection module 40 in the compartment 11 of the external housing 10 with only the output connector 434 of the electrical output cable 433 extending to the outside.

Referring to FIGS. 1-4, the water temperature display module 60 comprises a display device 61, a display holder 62, and an electrical input cable 63. The display device 61 receives a signal and displays a water temperature. The display holder 62 comprises a base 621, a lid 622, and a gasket 623. The display device 61 is arranged in the base 621 and the lid 622 is set on and covers the base 621. The lid 622 comprises a light-transmitting window 624 formed therein at a location corresponding to the display device 61. The gasket 623 is arranged and fixed between the base 621 and the lid 622. The electrical input cable 63 has an end electrically connected to the display device 61 and an opposite end that is formed with an input connector 631.

The above provides an introduction to the components of the water temperature detection valve 100 according to a preferred embodiment of the present invention and assembly thereof. The following will provide a description to the operation of the present invention.

Figure 1:
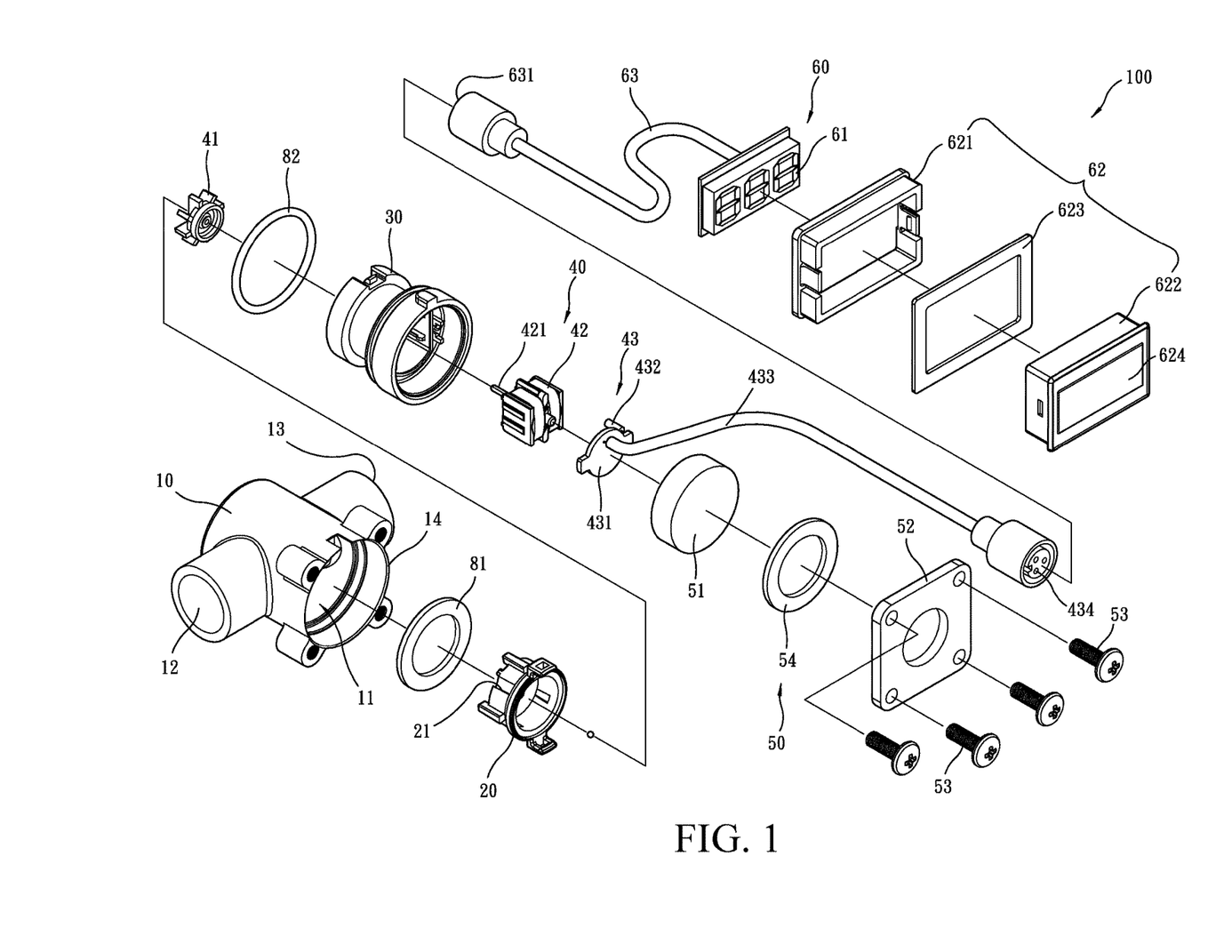
FIG. 1 is an exploded view showing a preferred embodiment of the present invention.
Figure 2:
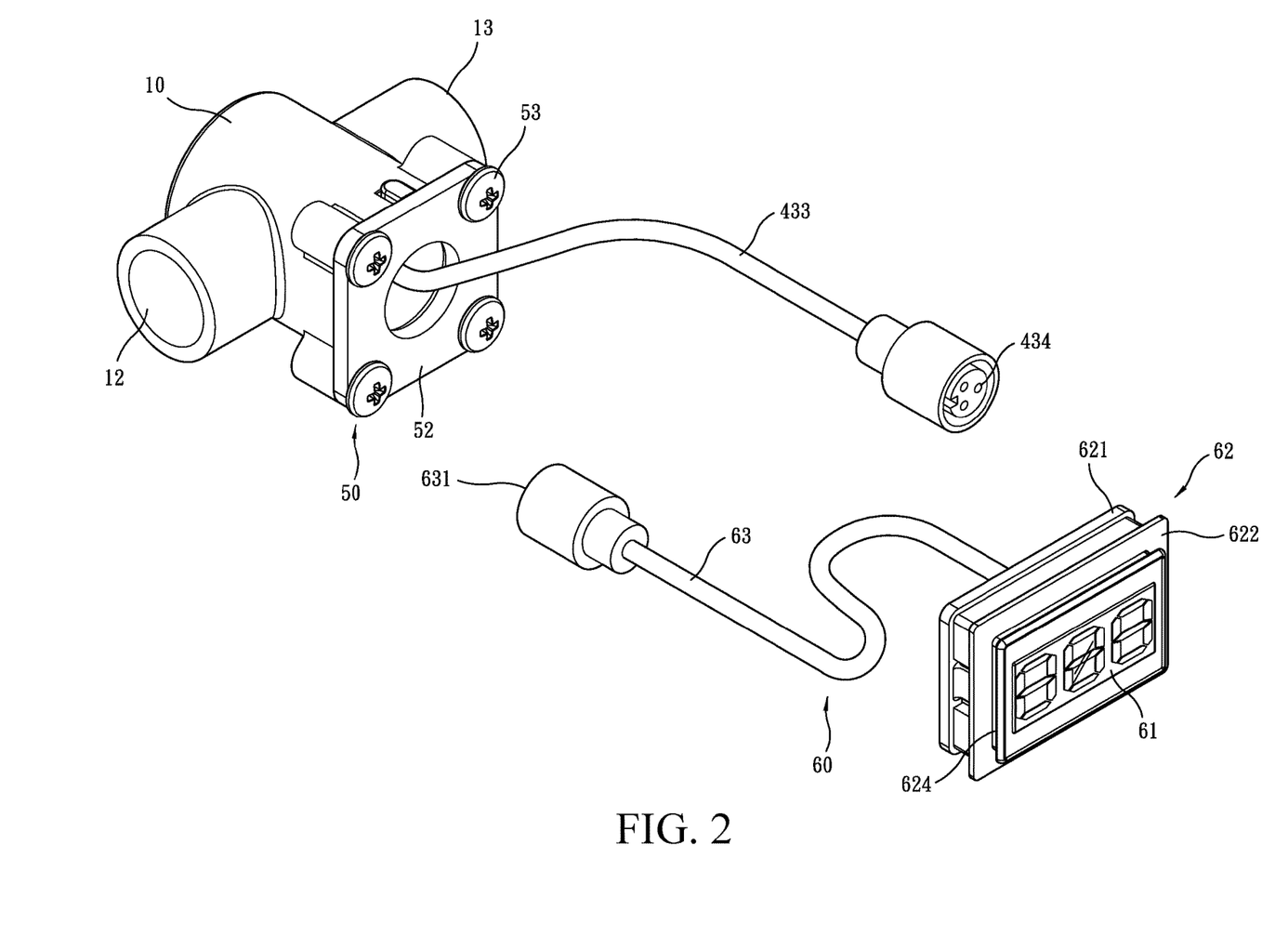
FIG. 2 is a perspective view, showing major parts of the embodiment of the present invention in a detached form.
Figure 3:
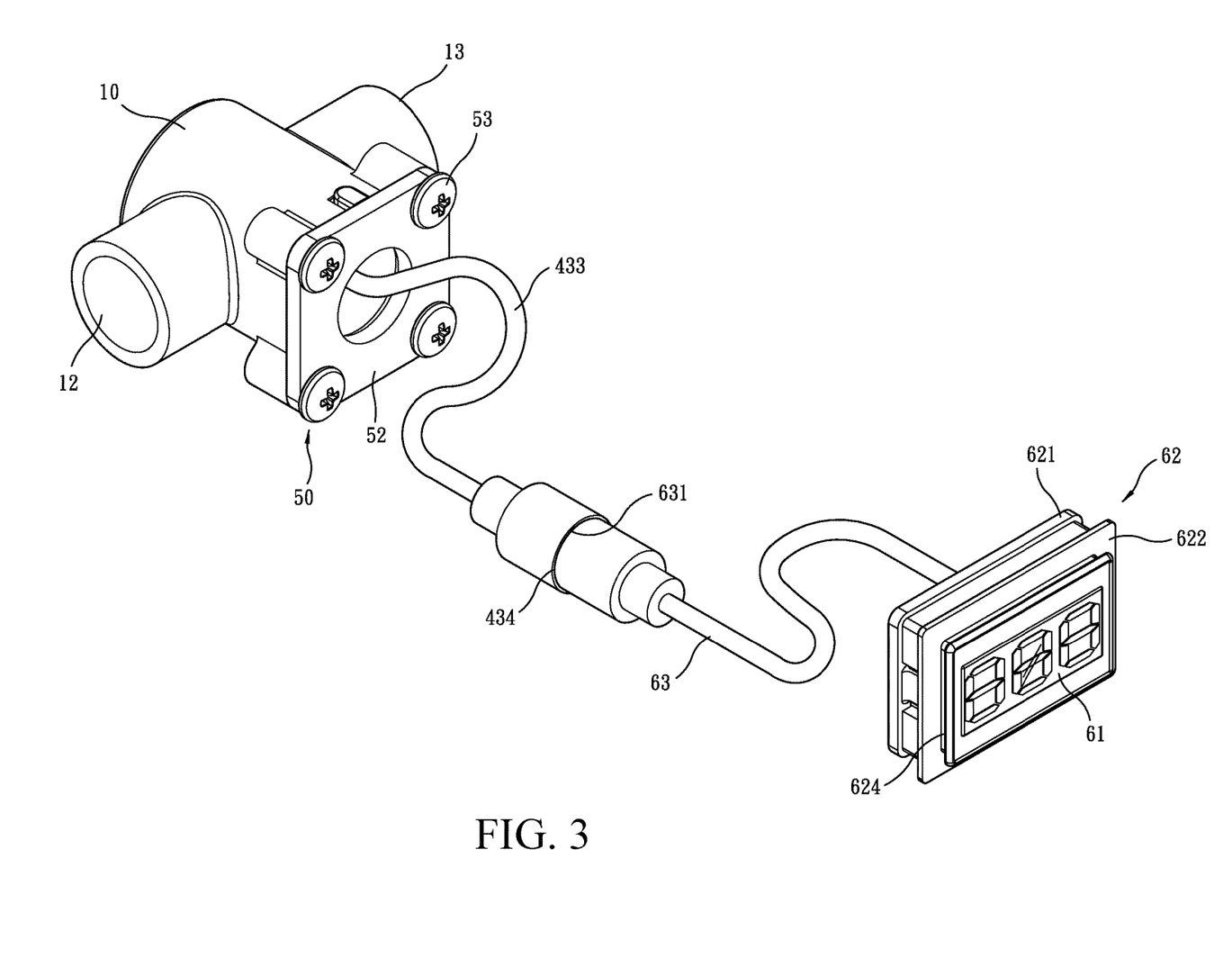
FIG. 3 is a perspective view of the embodiment shown in FIG. 1 in an assembled form.
Figure 4:
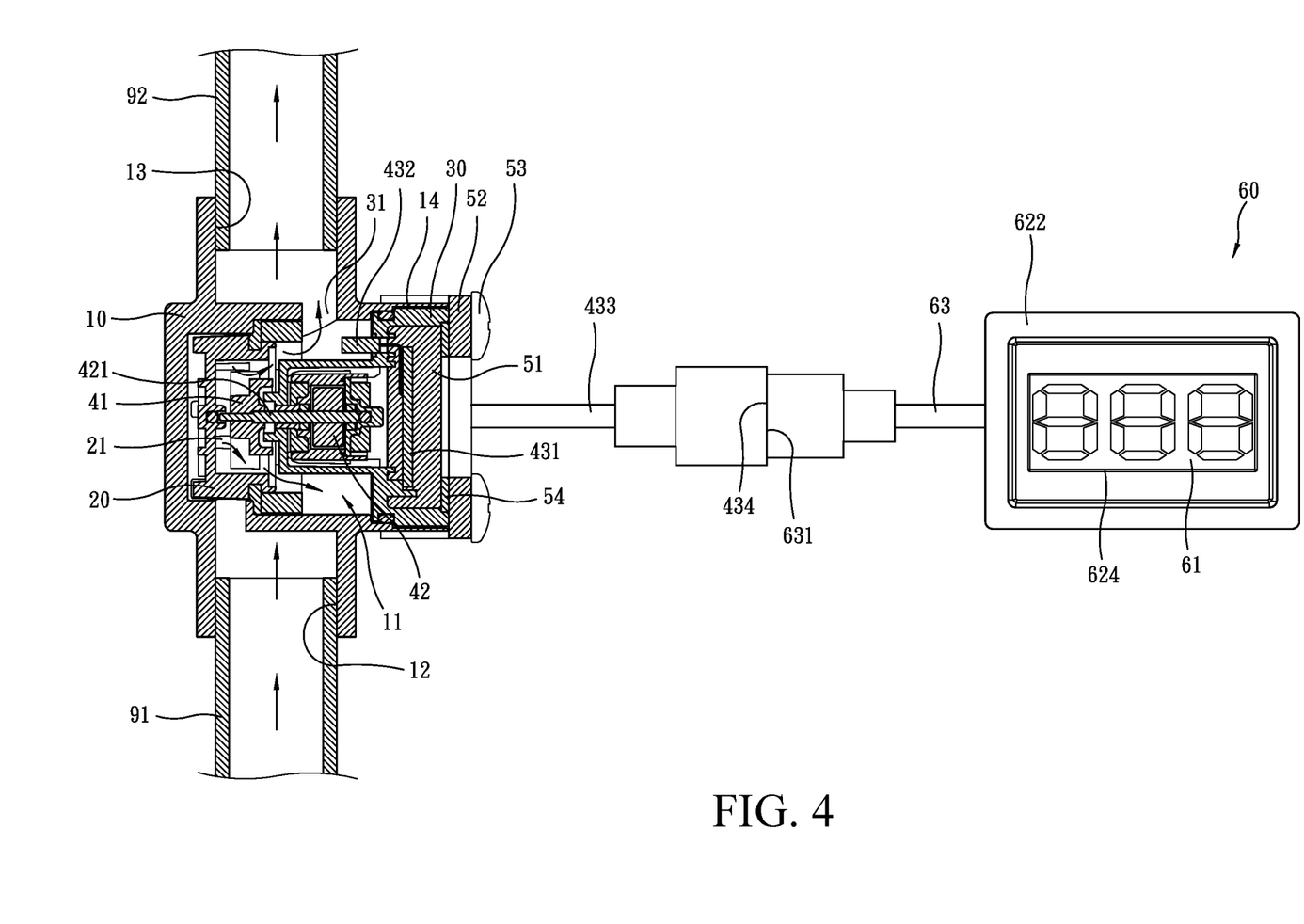
FIG. 4 is a cross-sectional view of the embodiment shown in FIG. 1 in an assembled to demonstrate an operation thereof.

Firstly, as shown in FIG. 4, the water inlet opening 12 of the external housing 10 is connected to a water ingress pipe 91 and the water outlet opening 13 of the external housing 10 is connected to a water egress pipe 92. The output connector 434 of the water temperature detection module 40 is coupled to the input connector 631 of the water temperature display module 60 to establish electrical connection therebetween.

As such, hot water, when flowing through the water ingress pipe 91 into the compartment 11 of the external housing 10, is guided the water guide holes 21 of the rear water guide 20 to get into the interior of the rear water guide 20, and is then discharged through the water discharge hole 31 of the front water guide 30 into the water egress pipe 92 to release the hot water to the outside. The hot water, when flowing into the interior of the rear water guide 20, drives the blade wheel 41 to rotate so that the blade wheel 41 simultaneously drives the spindle 421 of the miniature electrical generator 42 to rotate for generation of electrical power that is supplied to the temperature detection unit 43, whereby the temperature detection unit 43 that is so supplied with electrical power allows the temperature sensor 432 to conduct temperature detection for the hot water inside the water discharge hole 31 and to transmit a signal of water temperature so detected through the electrical output cable 433 and the electrical input cable 63 to the display device 61 to allow the display device 61 to display the water temperature, thereby achieving an effect of displaying of water temperature.

Electrical power that is required for the operation of the display device 61 may also be supplied from the miniature electrical generator 42 and transmitted through the circuit board 431, the electrical output cable 433, and the electrical input cable 63 to the display device 61.

As such, according to the present invention, the water temperature detection module 40 and the water temperature display module 60 are electrically connectable, in a detachable manner, through the electrical input cable 63 and the electrical output cable 433. The electrical input cable 63 and the electrical output cable 433 can be selected to have such lengths according to an actual application thereof so that the distance between the water temperature detection module 40 and the water temperature display module 60 is increased to allow the water temperature detection module 40 to be mounted to a pipe arranged inside a wall, while the water temperature display module 60 can be located outside the wall so that convenience and adaptability of use can be improved.

Figure 5:
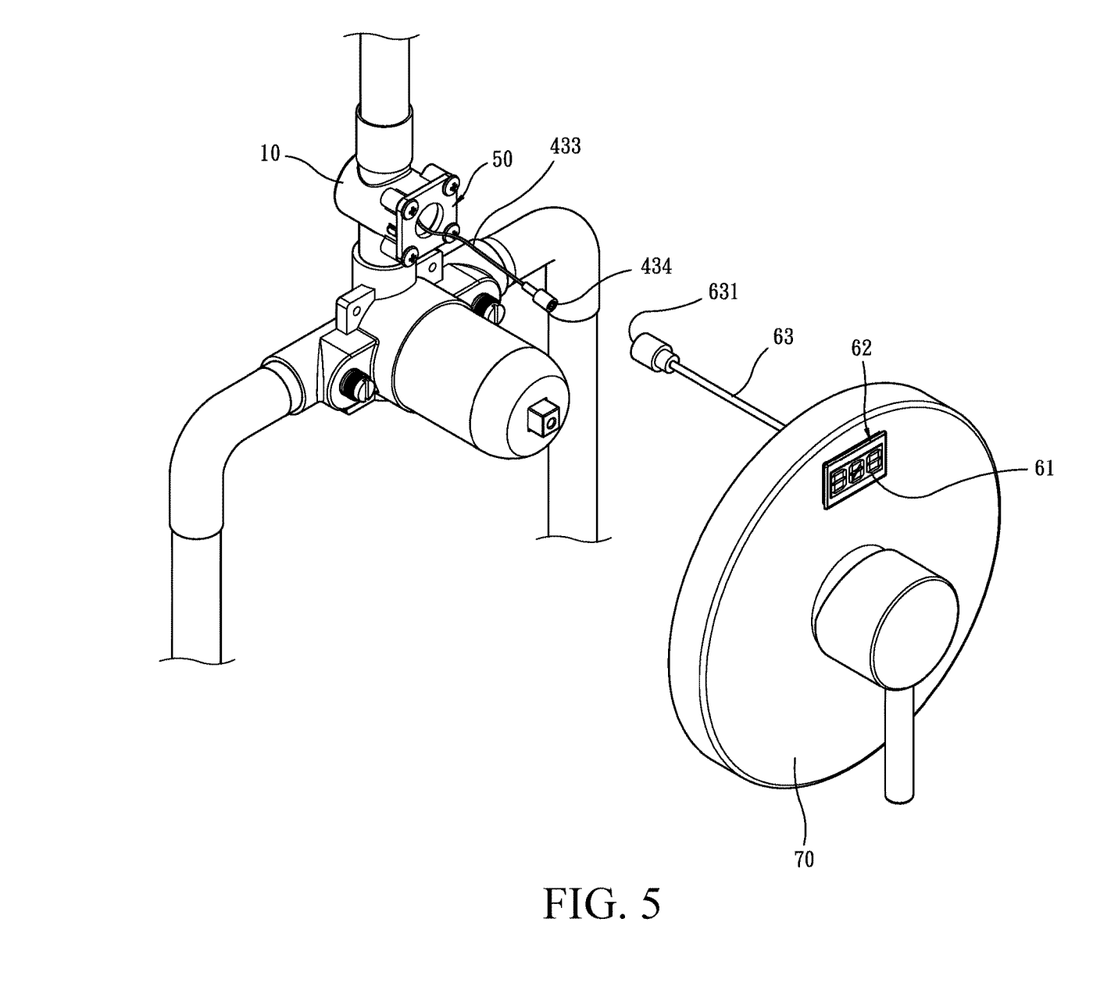
FIG. 5 is a perspective view illustrating an example of application of the embodiment of FIG. 1 in a detached form.
Figure 6:
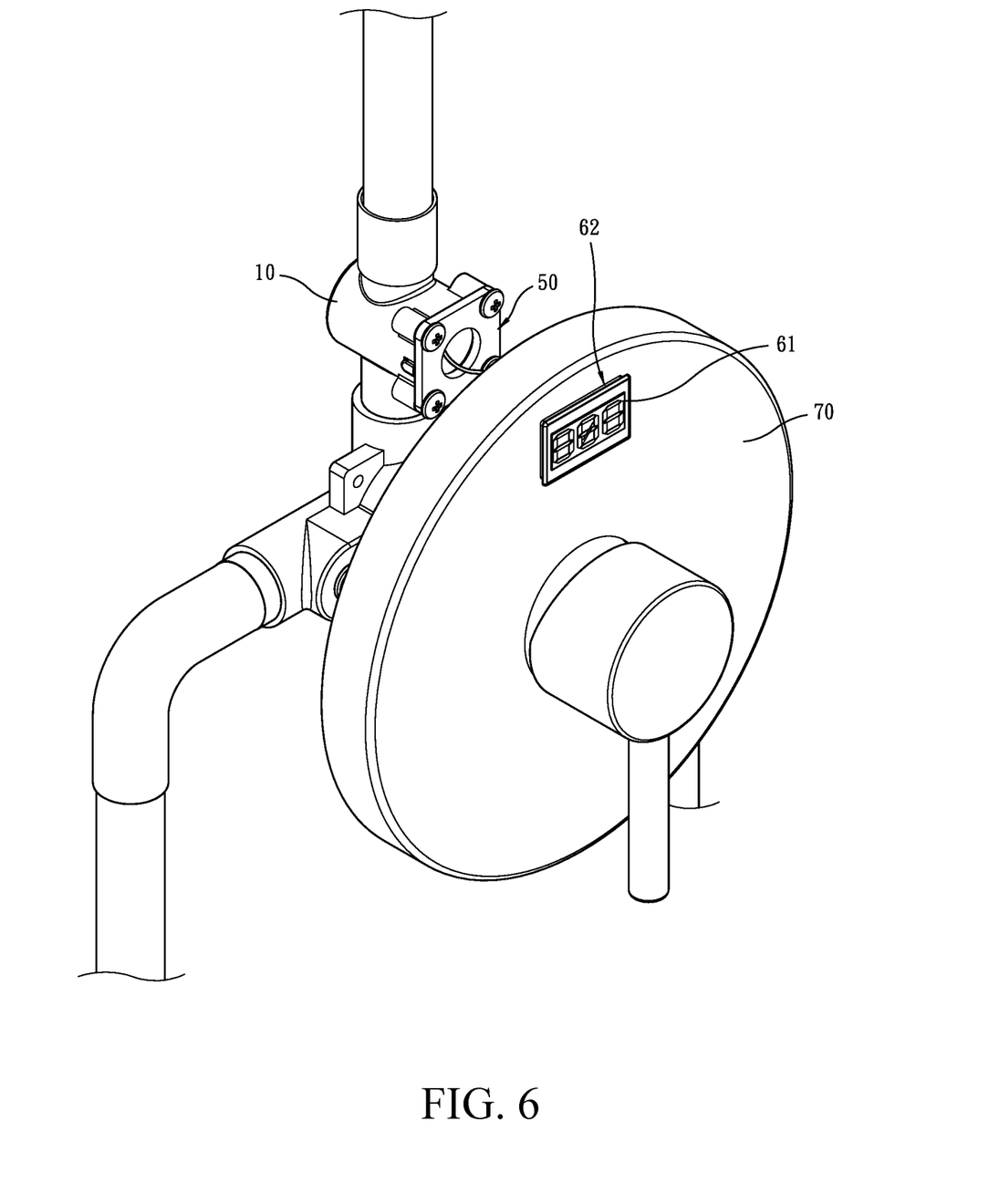
FIG. 6 is a perspective view illustrating the example of application of the embodiment of FIG. 1 in an assembled form.

Further, the present invention may further comprise a decoration cover 70. As shown in FIGS. 5 and 6, the decoration cover 70 is structured to receive the display holder 62 of the water temperature display module 60 to be embedded therein to improve the integrity of the present invention.

Figure 7:
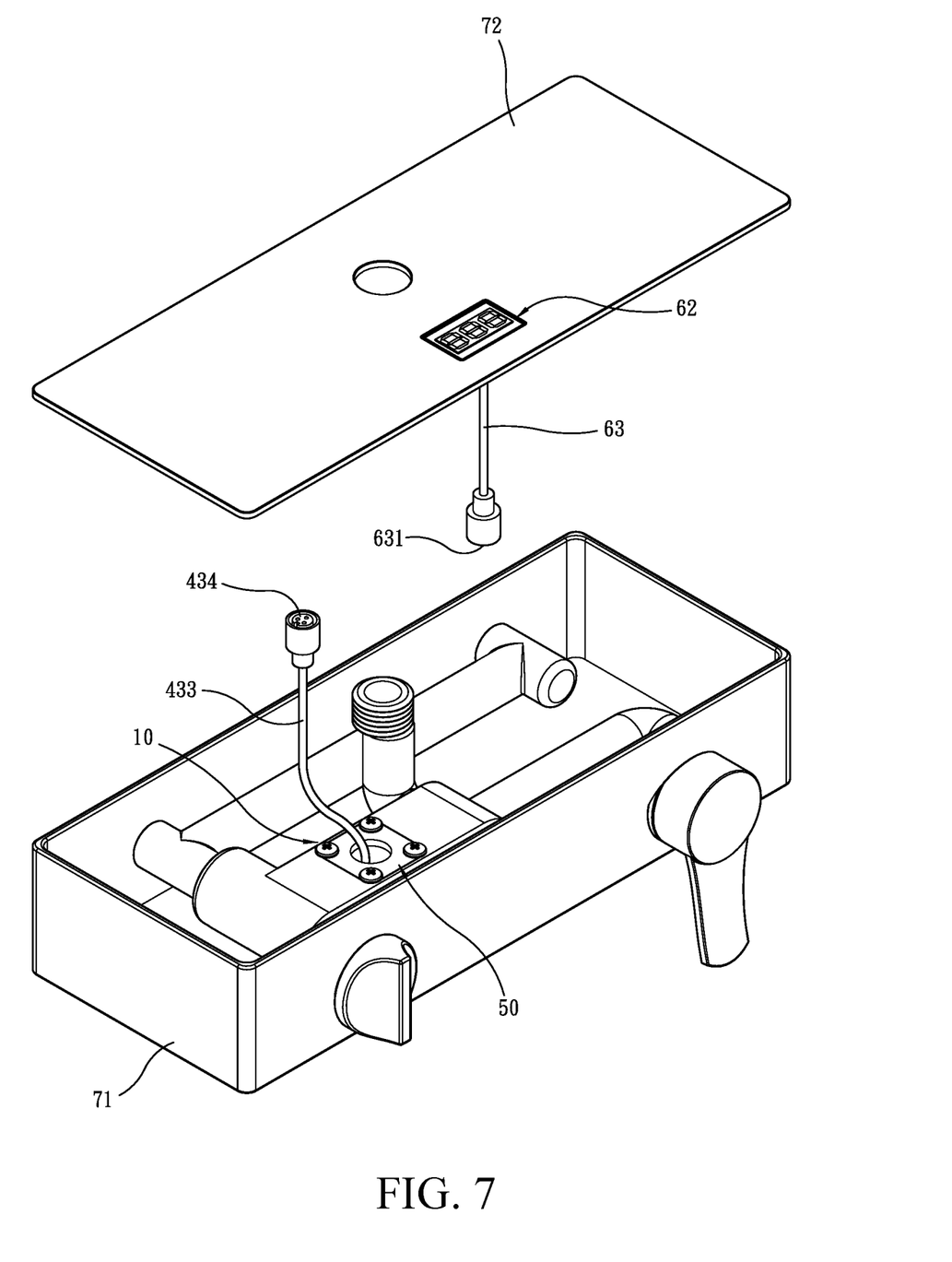
FIG. 7 is a perspective view illustrating another example of application of the embodiment of FIG. 1 in a detached form.
Figure 8:
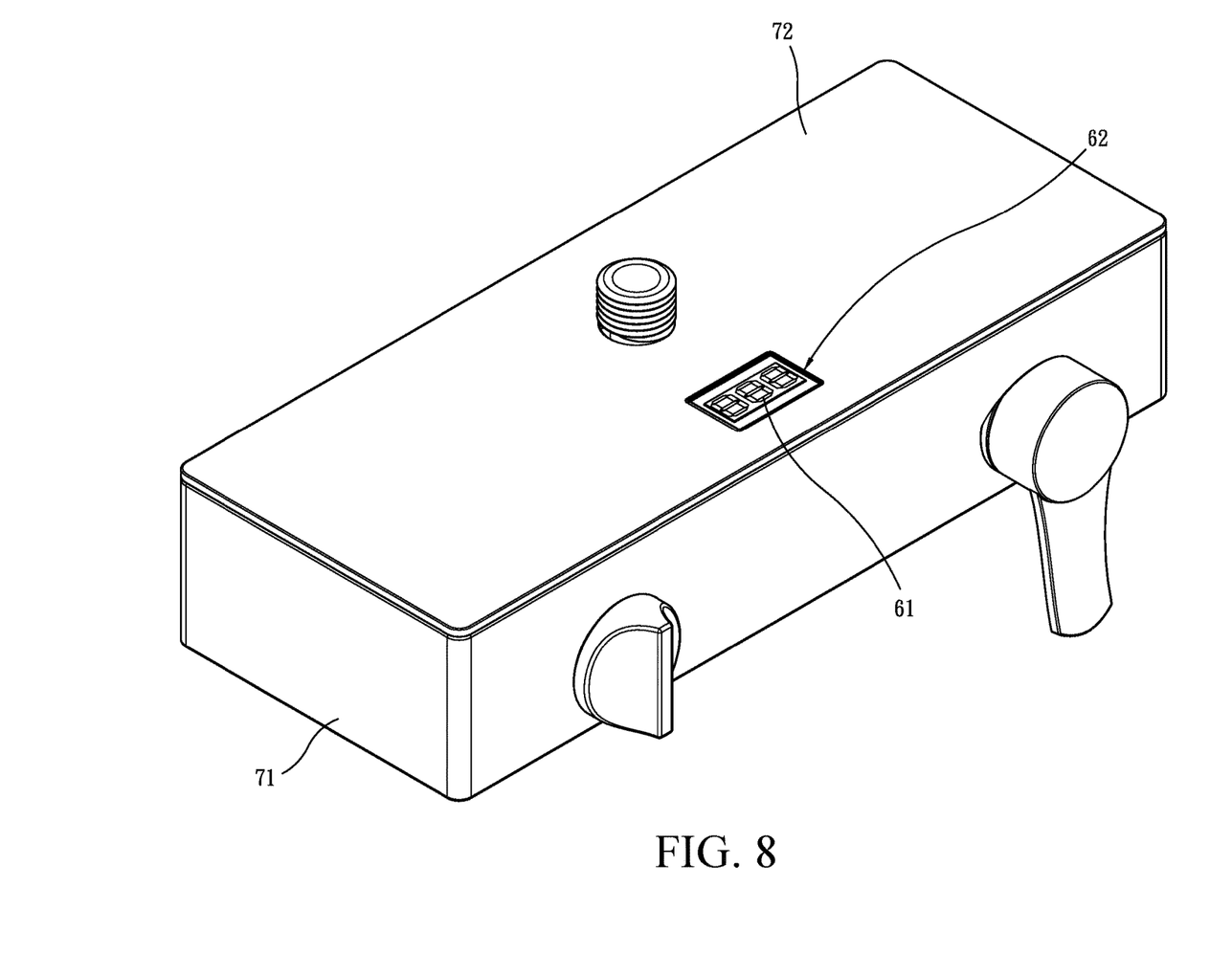
FIG. 8 is a perspective view illustrating said another example of application of the embodiment of FIG. 1 in an assembled form.

Further, as shown in FIGS. 7 and 8, the present invention may further comprise an encasing box 71 and a decorative cover 72. The encasing box 71 is structured to receive the external housing 10 to be positioned therein, and the decorative cover 72 can be set on and closes the encasing box 71 and to receive the display holder 62 of the water temperature display module 60 to be embedded therein, making the application of the present invention wider.

Further, the present invention may further comprises a gasket 81 arranged between an outer circumference of the rear water guide 20 and an inside surface of the compartment 11 of the external housing 10 and a gasket 82 arranged between an outer circumference of the front water guide 30 and an inside surface of the compartment 11 of the external housing 10 to improve sealing against water leakage.

In the above embodiment, the closure cover 50 comprises a sealing member 51, an outer lid 52, a plurality of bolts 53, and a gasket 54. The sealing member 51 is set in the installation hole 14 of the external housing 10 to close and seal the front water guide 30. The outer lid 52 is fixed by the bolts 53 to the external housing 10 to close outside the installation hole 14. The gasket 54 is positioned between the base 51 and the outer lid 52.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A water temperature detection valve, comprising:
   an external housing, which is formed, in an interior thereof, with a compartment and comprises, formed therein, a water inlet opening formed thereon to communicate between the compartment and outside, a water outlet opening communicating between the compartment and the outside, and an installation hole communicating between the compartment and the outside;
   a rear water guide, which is arranged in the compartment of the external housing and comprises a plurality of water guide holes communicating between interior and exterior the rear water guide;
   a front water guide, which is arranged in the compartment of the external housing, the front water guide having a rear end coupled to a front end of the rear water guide, the front water guide comprising a water discharge hole communicating between interior and exterior of the front water guide, the water discharge hole being in communication with the water guide holes and the water outlet opening;
   a water temperature detection module, which is arranged in the interiors of the rear water guide and the front water guide to generate electrical power and to conduct detection of temperature of water inside the water discharge hole and comprises a blade wheel, a miniature electrical generator, and a temperature detection unit, wherein the blade wheel is arranged in the interior of the rear water guide; the miniature electrical generator is arranged in the interior of the front water guide; the miniature electrical generator is movable in unison with the blade wheel; the temperature detection unit comprises a circuit board, a temperature sensor electrically connected to the circuit board, and an electrical output cable having an end electrically connected to the circuit board, the circuit board being electrically connected to the miniature electrical generator, the circuit board being arranged in the interior of the front water guide, the temperature sensor being arranged in the water discharge hole, the electrical output cable extending outside the external housing; and
   a water temperature display module, which comprises a display device, a display holder, and an electrical input cable, the display device being arrange inside the display holder, the display holder comprises a light-transmitting window formed therein at a location corresponding to the display device, the electrical input cable having an end electrically connected to the display device and an opposite end connectable, in a detachable manner, to the electrical output cable.

2. The water temperature detection valve according to claim 1, wherein the miniature electrical generator comprises a spindle, which is coupled to a central axis of the blade wheel.

3. The water temperature detection valve according to claim 1, wherein the electrical output cable has an opposite, free end that is formed with an output connector, the electrical input cable having a free end that is formed with an input connector, the output connector and the input connector being connectable, in a detachable manner, with each other.

4. The water temperature detection valve according to claim 1, wherein the display holder comprises a base, a lid, and a gasket, the display device being arranged in the base, the lid being set on and covering the base, the light-transmitting window being formed in the lid, the gasket being arranged between the base and the lid.

5. The water temperature detection valve according to claim 1 further comprising a closure cover, which is set in and closes the installation hole of the external housing to retain the rear water guide, the front water guide, and the water temperature detection module in the compartment of the external housing with only the electrical output cable extending to the outside.

6. The water temperature detection valve according to claim 5, wherein the closure cover comprises a sealing member, an outer lid, a plurality of bolts, and a gasket, the base being arranged in the installation hole of the external housing to close and seal the front water guide, the outer lid being fixed by the bolts to the external housing so as to be set outside and close the installation hole, the gasket being positioned between the base and the outer lid.

7. The water temperature detection valve according to claim 1 further comprising a decoration cover, which receives the display holder of the water temperature display module to be embedded therein.

8. The water temperature detection valve according to claim 1 further comprising an encasing box and a decorative cover, the encasing box receiving the external housing to dispose therein, the decorative cover being set on and close the encasing box and receiving the display holder of the water temperature display module to be embedded therein.

9. The water temperature detection valve according to claim 1 further comprising a gasket arranged between an outer circumference of the rear water guide and an inside surface of the compartment of the external housing.

10. The water temperature detection valve according to claim 1 further comprising a gasket arranged between an outer circumference of the front water guide and an inside surface of the compartment of the external housing.

* * * * *